(12) United States Patent
Van Druten et al.

(10) Patent No.: US 8,800,405 B2
(45) Date of Patent: Aug. 12, 2014

(54) TRANSMISSION SYSTEM

(71) Applicant: DTI Group, BV, Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group B.V., Eindhoven (NL)

( * ) Notice: Subject to any disclaimer, the term of this patent is extended or adjusted under 35 U.S.C. 154(b) by 0 days.

(21) Appl. No.: 13/951,218

(22) Filed: Jul. 25, 2013

(65) Prior Publication Data

US 2013/0312557 A1 Nov. 28, 2013

Related U.S. Application Data

(63) Continuation of application No. PCT/NL2012/050043, filed on Jan. 25, 2012.

(30) Foreign Application Priority Data

Jan. 25, 2011 (NL) ...................................... 2006069
Jan. 2, 2012 (NL) ...................................... 2008072
Jan. 4, 2012 (NL) ...................................... 2008082

(51) Int. Cl.
*F16H 37/06* (2006.01)
(52) U.S. Cl.
USPC .............................................. 74/664; 74/325
(58) Field of Classification Search
USPC ............................ 74/325, 331, 333, 340, 664
See application file for complete search history.

(56) References Cited

U.S. PATENT DOCUMENTS

| 3,923,115 A | * | 12/1975 | Helling | ...................... 180/65.25 |
| 4,260,919 A | * | 4/1981 | Fleming | ........................ 310/113 |
| 5,558,589 A | * | 9/1996 | Schmidt | ............................ 475/5 |
| 5,730,676 A | * | 3/1998 | Schmidt | ............................ 475/5 |
| 6,558,283 B1 | | 5/2003 | Schnelle | |
| 2003/0199360 A1 | | 10/2003 | Biallas | |
| 2006/0142101 A1 | | 6/2006 | Chen | |
| 2008/0064550 A1 | | 3/2008 | Holmes | |

FOREIGN PATENT DOCUMENTS

GB 2 186 333 8/1987

OTHER PUBLICATIONS

Author: Tenberge, P.; Title: Double-Clutch Transmission—Power-Shiftable Winding Transmission; Date: Mar. 13, 2002; Pertinent Pages: vol. 1665, pp. 1033-1050, XP009094673, ISSN: 0083-5560, the whole document.

* cited by examiner

*Primary Examiner* — Ha D Ho
(74) *Attorney, Agent, or Firm* — Eric Karich (57) ABSTRACT

A transmission system has a clutch module with a single input and two outputs. First and second clutch devices are positioned between the input and the two outputs. A transmission module, having two inputs and a single output, includes two sub-transmissions where at least a single speed transforming gear or a single transmission clutch is located between an input and an output of each sub-transmission. The two outputs of the clutch module are connected here to the two inputs of the transmission module. Between the input and the first output of the clutch module is located a first planetary gear set, and between the input and the second output is located a second planetary gear set.

5 Claims, 6 Drawing Sheets

TRANSMISSION SYSTEM

CROSS-REFERENCE TO RELATED APPLICATIONS

This application for a utility patent is a continuation of a previously filed PCT patent application, now abandoned, having the application number PCT/NL2012/050043, filed 25 Jan. 2012 (WO 2012/102613 A1).

This application also claims the benefit of Netherlands National Applications No. 2006069, filed 25 Jan. 2011; No. 2008072, filed 2 Jan. 2012; and No. 2008082, filed 4 Jan. 2012.

DESCRIPTION

1. Field of the Invention

The invention relates to a transmission system.

The transmission system comprises:
- a clutch module, having a single input and a first and a second output, where between the first output and the input is located a first clutch device equipped with first energizing mechanism, and between the second output and the input is located a second clutch device equipped with second energizing mechanism, and
- a transmission module, having a single output and a first and a second input, where between the first input and the output is located a first sub-transmission equipped with at least a single speed transforming gear and/or a single transmission clutch, and between the second input and the output is located a second sub-transmission also equipped with at least a single speed transforming gear and/or a single transmission clutch, where the two outputs of the clutch module are connected to the two inputs of the transmission module.

A clutch device is to be understood to be in this context for example a clutch, a brake or an electromotor. Energizing mechanism may in this respect be, for example, an electromotor with a speed transforming gear, a mechanical spring, a hydraulic cylinder or an electric coil respectively.

The speed transforming gear in this context is preferably a mechanical transmission such as a geared transmission, a planetary gear set, a continuously variable transmission, a chain transmission etc., but the speed transforming gear need not of necessity be a speed reduction or speed acceleration, but may also be a 1 to 1 transmission formed for example of a shaft.

2. State of the Art

A transmission system of this type is known from EP-A-1 625 037. In this known transmission system the clutch module comprises a planetary gear set and a friction clutch and the transmission module comprises a shaft connected to the planetary gear set as well as a clutch-connected transmission having a plurality of couplable geared transmissions. The purpose of the planetary gear set is to enable transmission gear ratio changes while the torque on the output is maintained. The transmission should then possess an adequate number of different speed transforming gears which are desired for cooperation with the engine and for achieving the desired comfort and performance of the vehicle in which this transmission is used.

SUMMARY OF THE INVENTION

It is an object of the invention to provide a transmission system of the type defined in the opening paragraph in which the transmission module can be arranged in a simpler and more cost effective manner, whereas the transmission system as a whole still has comparable or even better properties (fewer gear wheels, more gears, better distribution of the gear ratios, fewer friction elements, and in which it is still possible to change the gear ratio while maintaining the torque on the output), without the clutch module being appreciably more expensive. For this purpose the transmission system according to the invention is characterized in that between the input and the first output of the clutch module are located first speed transforming mechanism, and between the input and the second output of the clutch module are located second speed transforming mechanism.

In an advantageous embodiment of the transmission system according to the invention the speed transforming mechanism are arranged as speed transforming gears and the clutch devices are arranged as clutches connected in series with the speed transforming gears.

In another advantageous embodiment of the transmission system according to the invention the speed transforming mechanism are arranged as bypass transmissions comprising at least three rotational members, of which the first rotational member is connected to the input, a second rotational member is connected to the first or second output respectively, and a third rotational member of the first and second bypass transmissions is connected to the first or second clutch device respectively, where the first rotational members of the two bypass transmissions are connected together.

In the latter embodiment it is advantageous to arrange the first and/or second clutch device as a brake and/or an electromotor. Preferably, the first and/or second clutch device is arranged as a brake which is formed by a claw clutch to the firm world which cannot dissipate energy, or by a friction brake which can dissipate energy indeed. The housing of the transmission module may for example function as the firm world.

By arranging the clutch devices and speed transforming mechanism as (friction) clutches connected in series with (geared) transmissions or as brakes (claw clutches to the firm world) and bypass transmissions (planetary gear sets), the clutch module can be arranged in a simple manner while the clutch devices can be energized in a simple manner.

A preferred embodiment of the transmission system according to the invention is characterized in that the third rotational members of the bypass transmissions and/or two of the three rotational members of at least one of the bypass transmissions can be connected together by means of a short circuit clutch. By energizing either of the clutch devices or the short circuit clutch, three different gear ratios can be realized with the clutch module. This may be obtained for any gear ratio in the transmission module so that three different speed transformations may be realized by any gear ratio in the transmission module.

A further preferred embodiment of the transmission system according to the invention is characterized in that the short circuit clutch can connect together the third rotational members of the bypass transmissions, and in that the clutch module includes a further short circuit clutch which is connected in series with the short circuit clutch in such manner that the third rotational members of the bypass transmissions can be connected together by closing both the short circuit clutch and the further short circuit clutch, and in that the clutch module further includes a third clutch device which is connected to the two short circuit clutches at a location in between the two short circuit clutches. An advantage of this embodiment is that not more than one controlled clutch device is needed to switch between any possible different gear ratios of the clutch module. The remaining clutch devices and the short circuit clutches then need not be controlled, which leads to a cost-effective result.

The bypass transmissions are preferably arranged as planetary gear sets, in which the first rotational members of the two planetary gear sets are formed by a single common planet carrier. Furthermore, preferably the planet gears of the planetary gear sets are bearing-mounted on the same shaft in the planet carrier and can rotate independently of each other.

In order to further enhance the functionality of the transmission system, a further embodiment of the transmission system according to the invention is characterized in that the transmission system comprises a transmission short circuit clutch which is located between the two outputs of the clutch module and/or the two inputs of the transmission module.

Even more enhancement of the functionality may be obtained if the transmission system comprises a further transmission short circuit clutch which is also located between the two outputs of the clutch module and/or the two inputs of the transmission module and is connected in series with the transmission short circuit clutch, where the two outputs of the clutch module and/or the two inputs of the transmission module can only be coupled together by closing the two transmission short circuit clutches.

In the latter configuration it is advantageous if the input can be connected to the two transmission short circuit clutches by means of a still further short circuit clutch at a location in between the two transmission short circuit clutches. This still further short circuit clutch may then preferably be a substitute for the short circuit clutch mentioned above.

The transmission short circuit clutches may preferably be switched by means of a single operating element with which three positions are possible: either or the two transmission short circuit clutches closed.

A further embodiment of the transmission system according to the invention is characterized in that the transmission module further includes a third sub-transmission comprising at least one speed transforming gear, the input of which third sub-transmission is connected to the two transmission short circuit clutches at a location in between the two transmission short circuit clutches, and the output of which is connected to the output of the transmission module.

The speed transforming gear in one or more of the sub-transmissions can preferably be switched on/off by means of a transmission clutch which forms part of the sub-transmission. One or more of the transmission clutch(es) and/or the transmission short circuit clutch(es) are then preferably arranged as a claw clutch and/or synchronizer.

A still further embodiment of the transmission system according to the invention is characterized in that the transmission system comprises an electromotor which is coupled or can be coupled to one of the components of the transmission system. The components of the transmission system are then for example said speed transforming gears, clutches, rotational members etc. The electromotor is then preferably used for synchronizing one or more of the transmission clutches, transmission short circuit clutches or clutch devices. The electromotor can also be used for electrically driving the load (the drive wheels) or braking it.

The following embodiments are preferred for achieving optimum gear ratios in the transmission system according to the invention. In a first one of these embodiments the gear ratio of the first speed transforming mechanism of the clutch module is chosen such that it is retarding towards the output of the clutch module if the first clutch device is braked. In a further embodiment the gear ratio of the second speed transforming mechanism of the clutch module is chosen such that it is accelerating towards the output of the clutch module if the second clutch device is braked. The most retarding speed transforming gear (within the transmission module) is then preferably located in the second sub-transmission.

In yet a further embodiment the highest (least retarding) transmission speed transforming gear of the aggregate transmission system is obtained by means of the second clutch device and the first sub-transmission, while the transmission short circuit clutch or all transmission short circuit clutches is/are closed. In yet again a further embodiment the lowest (most retarding) transmission speed transforming gear ($1^{st}$ gear) of the aggregate transmission system is obtained by means of the first clutch device, the first speed transforming gear of the clutch module and the second sub-transmission, while the transmission short circuit clutch or all transmission short circuit clutches is/are closed. In still a further embodiment the $2^{nd}$ gear of the transmission system is obtained by means of one of the short circuit clutches and the second sub-transmission.

Yet a further embodiment of the transmission system according to the invention is characterized in that the transmission module comprises a reverse gear which is located between the sub-modules and comprises two extra gear wheels which are in meshing engagement with gear wheels of the speed transforming gears of the sub-transmissions. Between the two extra gear wheels is preferably located a reverse clutch. The two extra gear wheels are preferably positioned coaxially on a lay shaft.

The invention likewise relates to a method of switching between gears in a transmission system according to the invention. With respect to this method the invention is characterized in that switching from a lower (for example $1^{st}$) gear to a higher (for example $2^{nd}$) gear of the transmission system, while drive torque on the output is maintained, is realized by energizing the second energizing mechanism of the second clutch device more and energizing the energizing mechanism of the first clutch device less until the short circuit clutch(es) can be closed substantially synchronously.

A further method of gear switching in a transmission system according to the invention is characterized in that at least one switching operation takes place in the transmission system where switching from the $x^{th}$ to the $(x+1)^{th}$ gear of the transmission system takes place via the $(x+2)^{th}$ gear.

BRIEF DESCRIPTION OF THE DRAWINGS

The invention will be described below in more detail based on examples of embodiment of the transmission system according to the invention represented in the drawing figures, in which.

DETAILED DESCRIPTION

Figure 1:
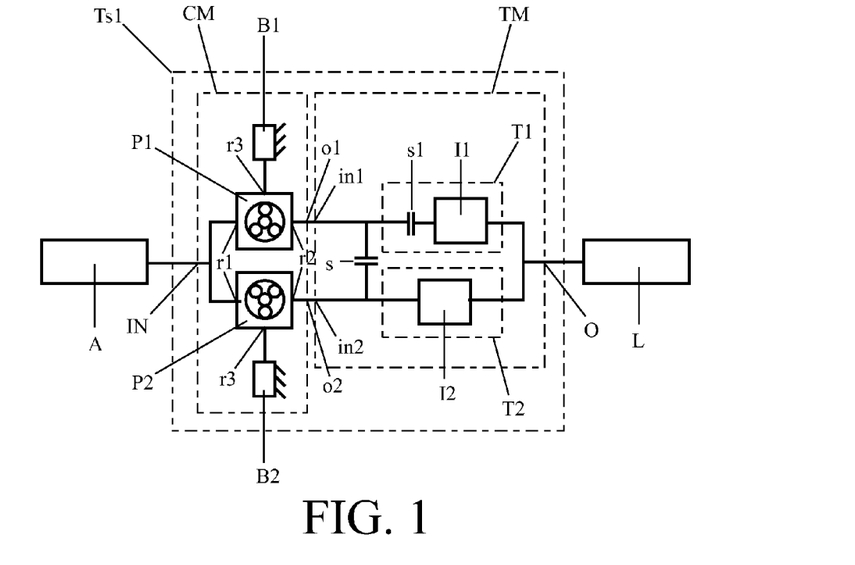
FIG. 1 shows a first embodiment of the transmission system according to the invention comprising two sub-transmissions and two planetary gear sets.

FIG. 1 gives a diagrammatic representation of a first embodiment of the transmission system according to the invention. The transmission system Ts1 comprises a clutch module CM having a single input IN and a first and a second output o1 and o2, and a transmission module TM having two inputs in1 and in2 and a single output O. The transmission system is located in a vehicle that has a drive source A, for example a combustion engine, which is connected to the input IN and drive wheels L which are connected to the output O.

Between the first output o1 and the input IN a first bypass transmission P1 is located which is formed by a planetary gear set having three rotational members, a first rotational member r1 of which is connected to the input IN, a second rotational member r2 of which is connected to the first output o1, and a third rotational member r3 of which is connected to a first clutch device B1. Between the second output o2 and the input IN is located a second bypass transmission P2 which is also formed by a planetary gear set having three rotational members, a first rotational member r1 of which is connected to the input IN, a second rotational member r2 of which is connected to the second output o2, and a third rotational member r3 of which is connected to a second clutch device B2. Each of the clutch devices B1 and B2 may be arranged as a friction brake, for example a wet plate or a dry plate friction brake or as a claw clutch to the firm world (which is formed by the housing of the transmission module), or as an electromotor (in which the stator is connected to the firm world and the rotor to the third rotational member).

The transmission module TM comprises two sub-transmissions T1 and T2. The first sub-transmission T1 is located between the first input in1 and the output O and is formed by a first geared transmission I1 and a transmission clutch s1 which is formed by a claw clutch. The second sub-transmission T2 is located between the second input in2 and the output O and is formed by a second geared transmission I2.

The two outputs o1 and o2 of the clutch module are connected to the two inputs in1 and in2 of the transmission module.

The transmission system further includes a transmission short circuit clutch s which is located between the two inputs in1 and in2 of the transmission module.

The speed transforming gear of the first bypass transmission P1 is retarding towards the first output o1 of the clutch module if the first clutch device B1 is braked and the speed transforming gear of the second bypass transmission P2 of the clutch module is retarding towards the second output o2 of the clutch module if the second clutch device B2 is braked. The speed transforming gear retarding most in the transmission module is located in the second sub-transmission T2.

In lieu of the geared transmission I1 and transmission clutch s1 shown, the first sub-transmission T1 may also be a continuously variable transmission either or not connected in series with a geared transmission.

Figure 2:
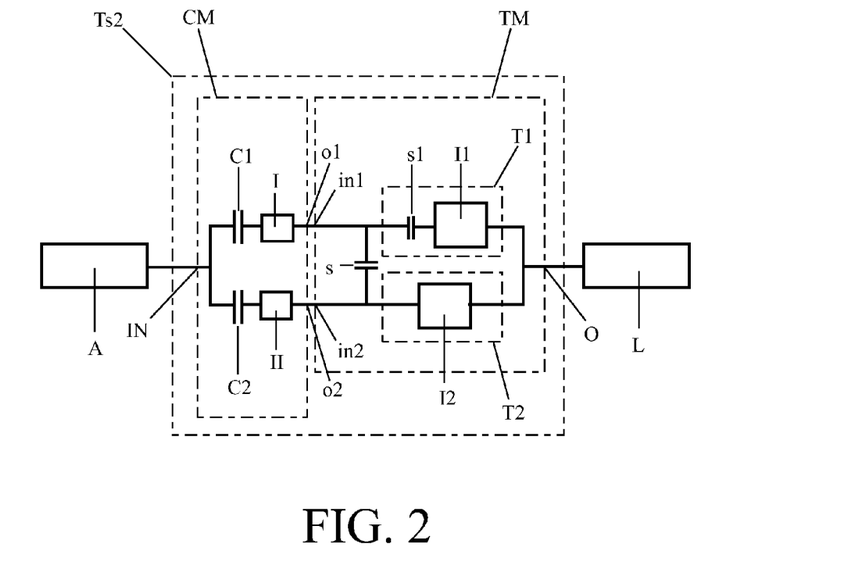
FIG. 2 shows a second embodiment of the transmission system according to the invention comprising two sub-transmissions and two speed transforming gears with clutches.

FIG. 2 shows a second embodiment of the transmission system according to the invention. All components of this transmission system that are similar to those of the first embodiment are referred to by like reference numerals. The bypass transmissions with brakes of the first embodiment are replaced by geared transmissions I, II connected in series with clutches C1, C2. This transmission system Ts2 has the same functionality as the transmission system Ts1 shown in FIG. 1.

Figure 3:
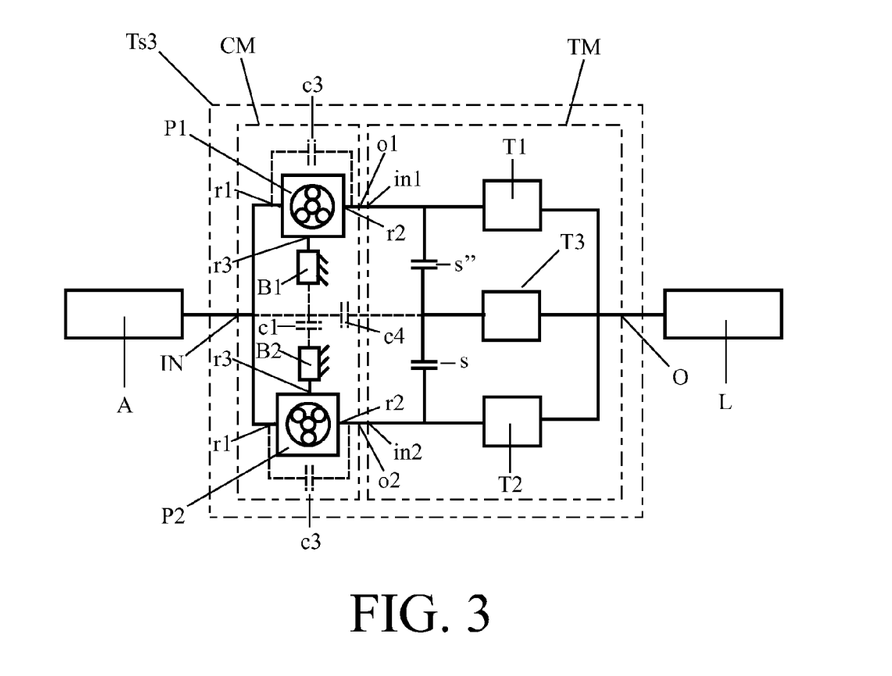
FIG. 3 shows a third embodiment of the transmission system according to the invention comprising two planetary gear sets with two controlled clutch devices.

FIG. 3 shows a third embodiment of the transmission system according to the invention. All components of this transmission system that are similar to those of the first embodiment are referred to by like reference numerals. In this transmission system Ts3 the clutch module CM comprises one or more short circuit clutches. This short circuit clutch may be located between the third rotational members r3 of the two bypass transmissions P1 and P2, referred to as c1 or in each one of the bypass transmissions a short circuit clutch c3 may be located between two of the three rotational members (by way of example the short circuit clutch is located here between the first and the second rotational member). The short circuit clutch may also be located between the input IN and the transmission short circuit clutches s and s" (the latter ones will be described hereinafter), referred to as c4. By closing the short circuit clutch, a 1 to 1 gear ratio can be realized in the clutch module CM. The short circuit clutch is preferably arranged as a claw clutch, but may also be arranged as a friction clutch, or as an electromotor in which the rotor and the stator form the individual clutch halves (the stator may be rotating in this version).

Furthermore, in this transmission system Ts3 the transmission module TM comprises a third sub-transmission T3 which is located between the first and the second sub-transmission T1 and T2 and a further transmission short circuit clutch s". This further transmission short circuit clutch s" is located between the inputs of the first and third sub-transmissions T1 and T3 and the transmission short circuit clutch s is located between the inputs of the third and second sub-transmissions T3 and T2. The transmission short circuit clutches s and s" can be switched by means of a single operating element with which three positions are possible: either or the two transmission short circuit clutches closed. The transmission short circuit clutches s and s" are preferably arranged as claw clutches, but may also be arranged as friction clutches, as synchromesh clutches or as freewheel bearing clutches or freewheel clutches.

The highest transmission speed transforming gear of the aggregate transmission system is obtained by means of the second clutch device B2 and the first sub-transmission T1, while the transmission short circuit clutch s is closed, and the lowest speed transforming gear ($1^{st}$ gear) of the aggregate transmission system is obtained by means of the first clutch device B1, the first bypass transmission P1 of the clutch module and the second sub-transmission T2, while the transmission short circuit clutch s is closed. The $2^{nd}$ gear of the transmission system is obtained by means of one of the short circuit clutches c1, c3 or c4 and the second sub-transmission T2.

Switching from the $1^{st}$ gear to the $2^{nd}$ gear of the transmission system while retaining the drive torque on the output may also be realized by closing the second clutch device B2 and energizing the first clutch device B1 less until the short circuit clutch c1, c3 or c4 can be closed substantially synchronously.

The first rotational members r1 are preferably arranged as a single planet carrier for the planet gears of the two bypass transmissions P1 and P2. The two rotational members r2 are preferably arranged as ring gears and the third rotational members r3 as sun gears.

Within each sub-transmission is located at least one speed transforming gear and/or a transmission clutch which may be located both before and after the speed transforming gear. The speed transforming gears may be arranged as a shaft (1:1 gear ratio) or as a geared transmission, chain transmission, planetary gear set (where the transmission clutch can connect one of the rotational members of it to the firm world/transmission housing), continuously variable transmission, friction gearing transmission or another transmission that is capable of transferring torque.

The gear ratios are preferably as follows:

P1 with B1 closed is retarding towards the output,
P2 with B2 closed is retarding towards the output,
Geared transmission I1 (within T1) has the highest gear ratio (accelerating) towards the output,
Geared transmission I2 (within T2) has the lowest gear ratio (retarding) towards the output, and
Geared transmission I3 (within T3) has a gear ratio that is situated between I1 and I2.

The choice of gear ratios is important for the operation of the transmission system. By means of the clutch devices B1 and B2 it is possible to switch from bypass transmission P1 to bypass transmission P2 and vice versa, while the torque transfer is maintained. Since the speed transforming gear Ic of the short circuit clutch has a direct gear ratio (1:1) and this speed transforming gear is located between the speed transforming gear Ip1 of the first bypass transmission P1 with brake B1 closed and the speed transforming gear Ip2 of the second bypass transmission P2 with brake B2 closed, it is also possible to switch from Ip1 to Ic (and vice versa) and from Ic to Ip2 (and vice versa) while the torque transfer is maintained (even if short circuit clutch c is arranged as a claw clutch). In this manner it is thus possible to switch 3 speed transforming gears by means of the clutch module (with two friction elements B1 and B2). This may apply to any speed transforming gear Ix (x is number of sub-transmission) in the transmission module TM, so that with each speed transforming gear Ix in the transmission module it is possible to realize 3 gear ratios of the transmission system.

Since Ip1 produces the lowest speed reduction and Ip2 the highest speed reduction, when changing from the highest gear by means of Ix to the (next) lowest gear by means of I(x+1) or vice versa, it is also possible to switch while maintaining torque transfer (without the need for realizing this via an idler gear). The outputs of the bypass transmissions P1 and P2 are then to be individually coupled to the speed transforming gears Ix and I(x+1). The transmission short circuit clutches s and/or s" are then necessary for realizing this. Furthermore, it should always be possible for the output of the bypass transmission P1 to be coupled to a higher speed transforming gear Ix while the output of the bypass transmission P2 is coupled to a lower speed transforming gear Ix. For realizing this, I1 is to be the highest speed transforming gear and I2 the lowest speed transforming gear and I3 in between the two.

The retarding speed transforming gear Ip1 and the accelating speed transforming gear Ip2 may be selected to be symmetrically situated around the 1:1 gear ratio (obtained by means of closure of the short circuit clutch, Ic=1) for creating a geometrical distribution of the gears. In the case of a harmonic distribution of the gears, an asymmetrical distribution may be selected where step size Ip1 to Ic exceeds that of Ic to Ip2. A fine harmonic distribution may further be achieved by skipping the centre speed transforming gear (Ic) within the sub-transmission T2 and switching directly between Ip1 and Ip2, as a result of which a larger step size occurs between $1^{st}$ and $2^{nd}$ gear.

The step size between $2^{nd}$ and $3^{rd}$ gear may be selected at random, by means of the gear ratio between T1 and T2 (or T3).

By selecting different configurations of the clutch devices B1 and B2, different transmission systems with distinctive functionalities may be realized as is indicated in a table hereinbelow.

| Version | B1 | B2 |
| --- | --- | --- |
| 1 | Brake | Brake |
| 2 | Electromotor | Electromotor |
| 3 | Electromotor | Brake |
| 4 | Brake | Electromotor |
| 5 | Brake + electromotor | Brake |
| 6 | Brake | Brake + electromotor |
| 7 | Electromotor + brake | Electromotor |
| 8 | Electromotor | Electromotor + brake |
| 9 | Electromotor + brake | Electromotor + brake |

In the above embodiments the brake may be arranged as a friction brake which can dissipate power, or a claw clutch fixed to the firm world and which cannot dissipate power. The electromotor may be arranged as a motor and/or generator by which the vehicle can be driven and by which the transmission clutches can be synchronized, or as a small servomotor by which only the synchronization of the transmission clutches can be carried out. Furthermore, it is possible to make combinations of the above.

Figure 4:
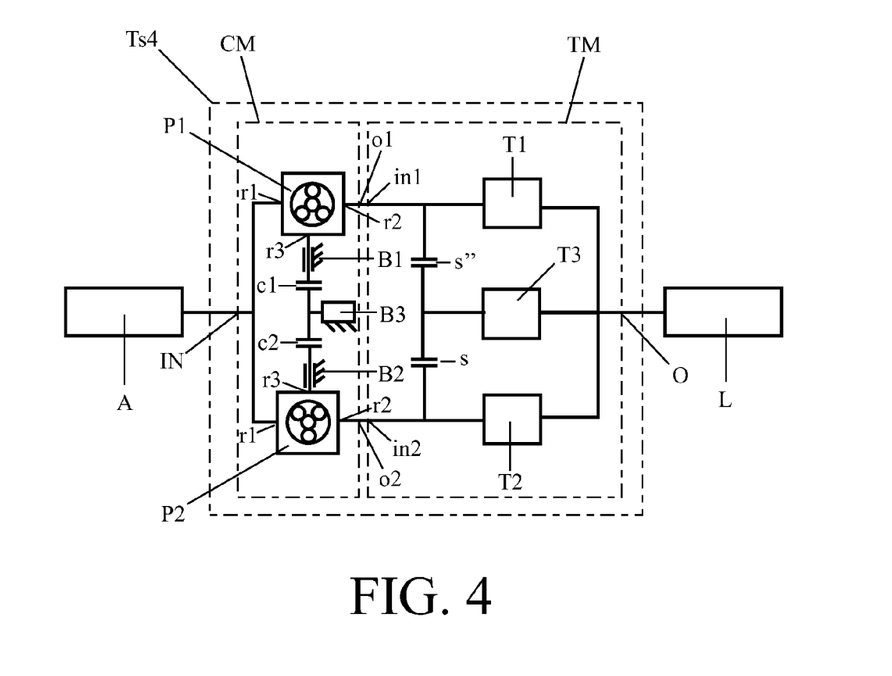
FIG. 4 shows a fourth embodiment of the transmission system according to the invention comprising two planetary gear sets with a single controlled clutch device.

FIG. 4 shows a fourth embodiment of the transmission system according to the invention. All components of this transmission system that are similar to those of the second embodiment are referred to by like reference numerals. In this transmission system Ts4 there are two short circuit clutches c1 and c2 present connected in series between the two third rotational members r3. The clutch devices B1 and B2 and the short circuit clutches c1 and c2 may be arranged here as claw clutches. Furthermore, there is a third clutch device B3 present which may be arranged as a friction brake and/or an electromotor (whose stator is connected to the firm world) which is connected to the two short circuit clutches. By means of the clutch device B3 and by closing short circuit clutch c1 the third rotational member r3 of the first bypass transmission P1 can be energized, after which, when the latter has been braked, claw clutch B1 can be closed in synchronism. Short circuit clutch c1 can then be opened and (after synchronization with the clutch device B3) short circuit clutch c2 can be closed. Subsequently, the third rotational member r3 of the second bypass transmission P2 can be energized (by closing brake B2), as a result of which brake B1 becomes torqueless and can be opened. After this, clutch device B3 can be energized further and short circuit clutch c1 can be closed in synchronism. As a result, the idler gear is realized by means of the short circuit clutches c1 and c2. Subsequently, clutch device B3 can be energized further so that c1 becomes torqueless and can be re-opened. Then clutch device B3 can be energized further after which, when it is braked, brake B2 can be closed in synchronism. The above operation also holds vice versa for switching bypass transmission P2 (by means of short circuit clutches c1 and c2) to bypass transmission P1.

An advantage of the above embodiment is that no more than a single controlled friction brake and/or electromotor (B3) is needed for switching between all gears. Clutch devices B1 and B2 and short circuit clutches c1 and c2 need not be controlled then, which may be more cost effective.

In the above variant clutch device B3 may also be arranged as a controlled (servo) stepping motor and clutch devices B1 and B2 as controlled friction brakes. By means of clutch device B3 all transmission clutches and the short circuit clutches c1 and c2 can then be synchronized and all these clutches can be arranged as claw clutches, which may be more cost effective.

Figure 5:
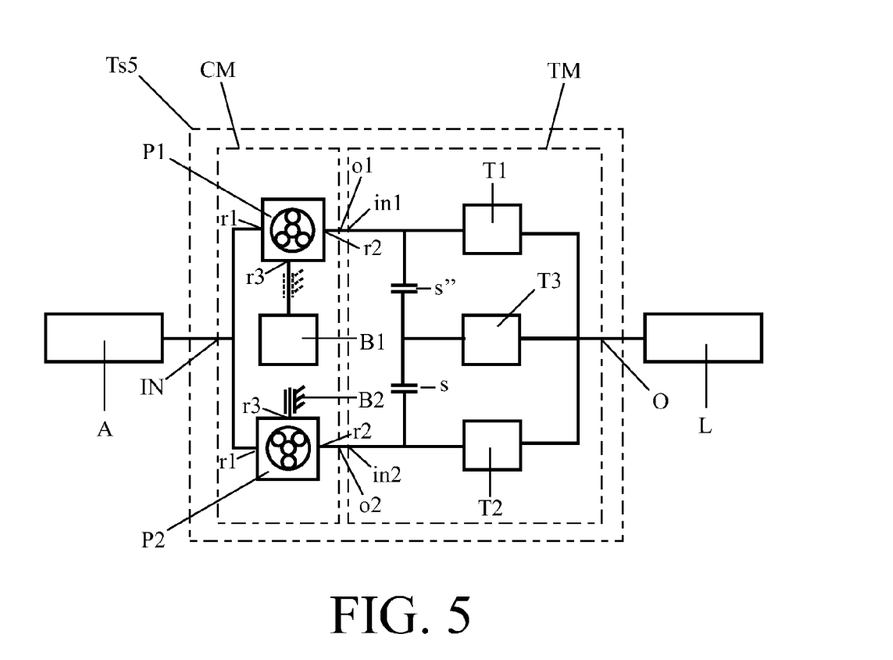
FIG. 5 shows a fifth embodiment of the transmission system according to the invention comprising two planetary gear sets with an electromotor and a controlled brake.

FIG. 5 shows a fifth embodiment of the transmission system according to the invention. In this embodiment the first clutch device B1 is formed by an electromotor and optionally has a brake on the drive shaft, and clutch device B2 as a brake. Optionally, a short circuit clutch may also be present.

There are two preferred embodiments here:

1) Brake B2 is a friction brake.
   Driving off is effected by energizing the electromotor as a generator after which any brake of the clutch device B1 can be closed synchronously.
   Switching from Ip1 to Ip2 is then effected by energizing clutch device B2 as a result of which brake B1 becomes torqueless and can be opened. After this the brake B2 can be closed completely.
   Switching from Ip2 to Ip1 is effected by energizing the electromotor as a generator so that brake B2 becomes torqueless and can be opened. Then brake B1 can be closed completely.
   An advantage of an electromotor coupled to the bypass transmission P1 is that the former needs to generate much less power (maximum electrical power lower by a factor of 3 to 5 than the power of the combustion engine) than if the electromotor were coupled to bypass transmission P2.
   Further, the electromotor can also be used in combination with the bypass transmission P1 for functioning as a continuously variable transmission and as a hybrid system for recovering for example braking energy and starting or assisting the combustion engine. Furthermore, the electromotor may also be used for driving the vehicle purely electrically if the input shaft is braked (by means of freewheel bearing) or if also brake B2 is energized. If also brake B2 is energized, the combustion engine may be started during the ride or run along without injecting fuel.
2) Brake B2 is arranged as a claw clutch fixed to the firm world.
   Just like 1), but different in that the switching from Ip1 to Ip2 is effected by energizing the electromotor M1 as a motor until the brake B2 can be closed synchronously. However, this is at the cost of much electrical power at high performance.

Figure 6:
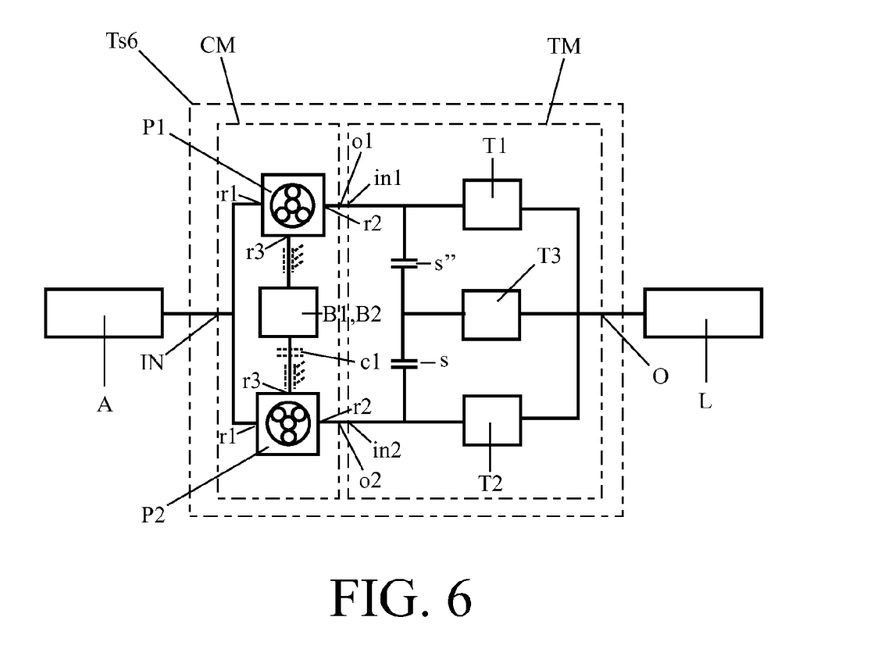
FIG. 6 shows a sixth embodiment of the transmission system according to the invention comprising two planetary gear sets and a single controlled electromotor.

FIG. 6 shows a sixth embodiment of the transmission system according to the invention. In this transmission system Ts6 the two clutch devices B1 and B2 are formed by a single electromotor which is located between the two third rotational members r3 (rotor coupled to one of the third rotational members and stator to the other one), so that these rotational members, when rotating relative to each other encounter resistance (and torque is transferred). Optionally, brakes and a clutch c may be present (indicated by means of broken lines). The electromotor may then provide the drive mechanism and/or synchronization of the transmission clutches.

Figure 7:
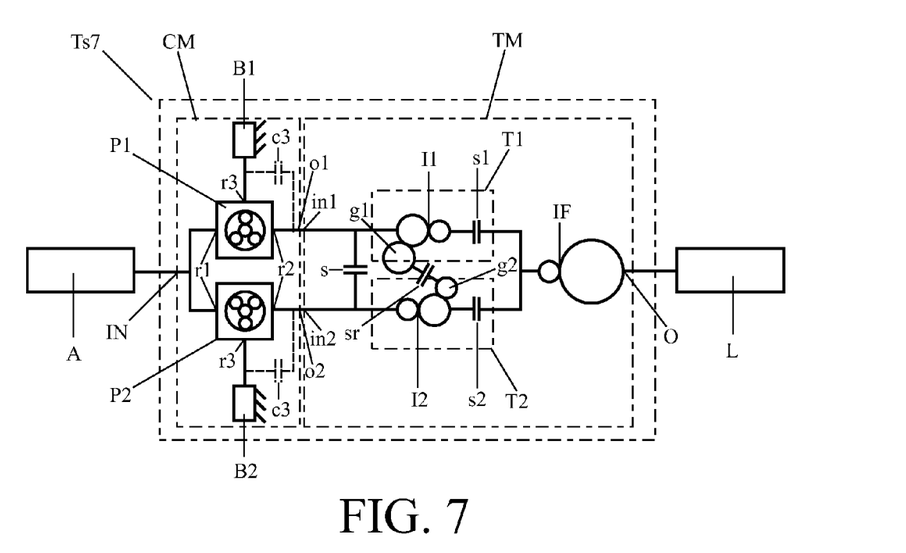
FIG. 7 shows a seventh embodiment of the transmission system according to the invention comprising two sub-transmissions and a reverse gear.

FIG. 7 shows a seventh embodiment of the transmission system according to the invention. In this transmission system Ts7 the transmission module TM comprises a reverse gear which is located between the sub-transmissions T1 and T2 and is formed by two extra gear wheels g1 and g2 and a reverse gear sr located in between. The two extra gear wheels are in engagement with gear wheels of the geared transmissions I1 and I2 of the sub-transmissions. The two extra gear wheels are positioned coaxially on a lay shaft (see FIGS. 8 and 9). The transmission clutches are indicated by s1 and s2 and can be operated by means of a single switching fork and the reverse clutch sr can be operated by means of a further switching fork. The transmission clutches s1 and s2 may also be located on the input side in lieu of the output side of the sub-transmissions shown here.

In lieu of being located between the two sub-transmissions, the reverse gear may also be located within either of the sub-transmissions T1 or T2. In all embodiments the reverse gear can be arranged as an unsynchronized version (without synchromesh).

Figure 8:
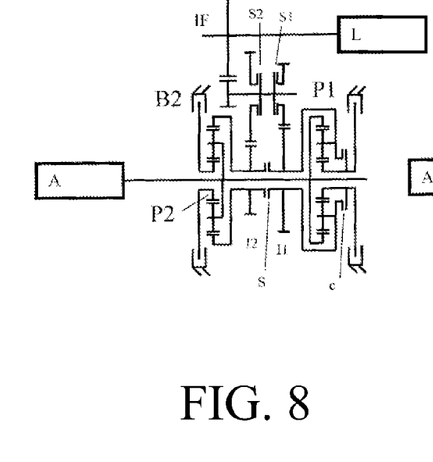
FIG. 8 shows a constructive embodiment of the transmission system shown in FIG. 7 having 5 or 6 gears.
Figure 9:
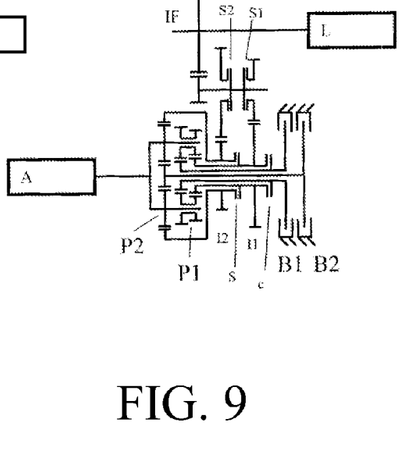
FIG. 9 shows a further constructive embodiment of the transmission system shown in FIG. 7 having 5 or 6 gears.

The transmission module Ts7 is equipped with a single lay shaft, see FIGS. 8 and 9 (this is the shaft on which s1 and s2 are located), where the output of T1 and the output of T2 are coupled to the output of the transmission module by means of a single end drive IF. In contrast with that which is shown in FIG. 7, the first gear wheel of the end drive IF to the differential may be the same gear wheel as the second gear wheel of the geared transmission I1, where s1 is coaxial with the transmission short circuit clutch s.

An embodiment of the transmission system shown in FIG. 7 is shown hereinafter in the form of a table:

| Gear | Ratio | Ratio step | B1 | B2 | s | C | S1 | S2 | SR |
|---|---|---|---|---|---|---|---|---|---|
| R | −15 | | x | | | | | x | x |
| N | | | | | | | | x | (x) |
| 1 | 16 | | x | | x | | | x | |
| 2 | 8.3 | 1.92 | | x | | | (x) | x | (x) |
| 3 | 5.1 | 1.65 | x | | (x) | | x | (x) | |
| 4 | 3.5 | 1.45 | | | | x | x | | |
| 5 | 2.6 | 1.33 | | x | x | | x | | |
| 1* | 11 | | | | | x | x | x | |
| | RC | 6.1 | | | | | | | |

1* is an idler gear that can be used in a geometric ratio distribution with a constant step size, so that 6 gears are possible.

In lieu of the configuration shown in FIG. 7, furthermore a clutch SF (not shown) may be present between the second input in2 of the transmission module TM and the output O of the transmission module, which clutch SF can directly couple the second input and the output (without the intervention of a speed transforming gear). Furthermore, the geared transmission I2 and end drive IF may both be located within the second sub-transmission T2, where the output of the first sub-transmission T1 is connected in between the speed transforming gear I2 and the end drive IF to the second sub-transmission. In addition, a further clutch may be located between the speed transforming gear I1 and end drive IF and the output of the transmission module, which further clutch is again located between the speed transforming gear IF and end drive IF and the clutch SF.

FIGS. 8 and 9 show two different constructive embodiments of the transmission system shown in FIG. 7, having 5 or 6 gears. The extra gear wheels of the reverse gear are not shown here for clarity's sake.

Figure 10:
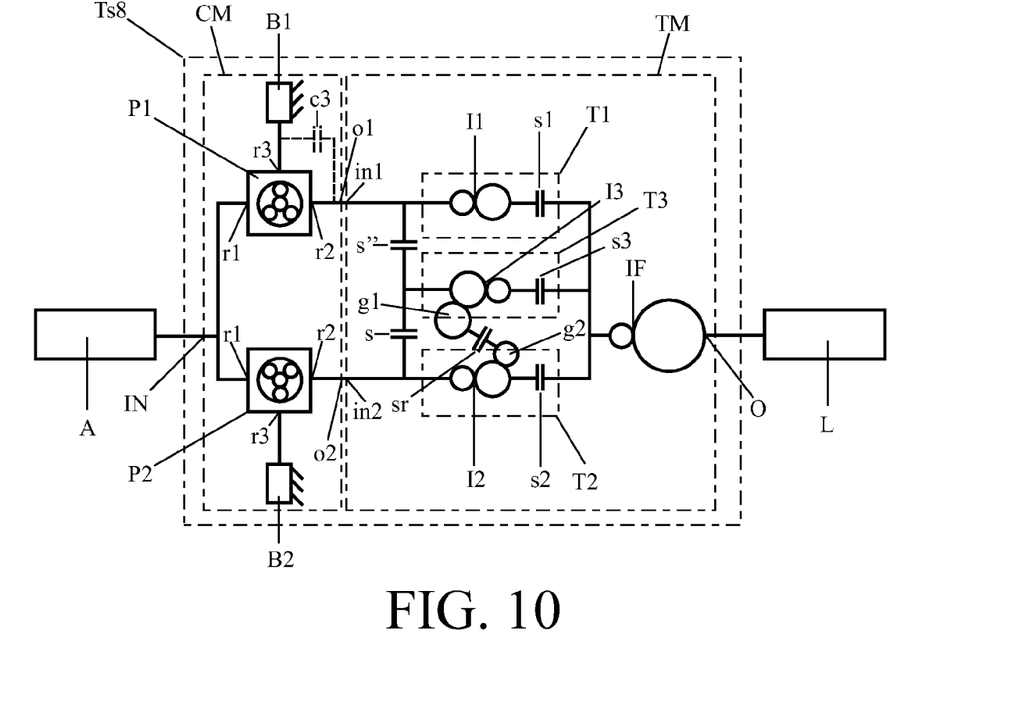
FIG. 10 shows an eighth embodiment of the transmission system according to the invention comprising three sub-transmissions and a reverse gear.
Figure 11:
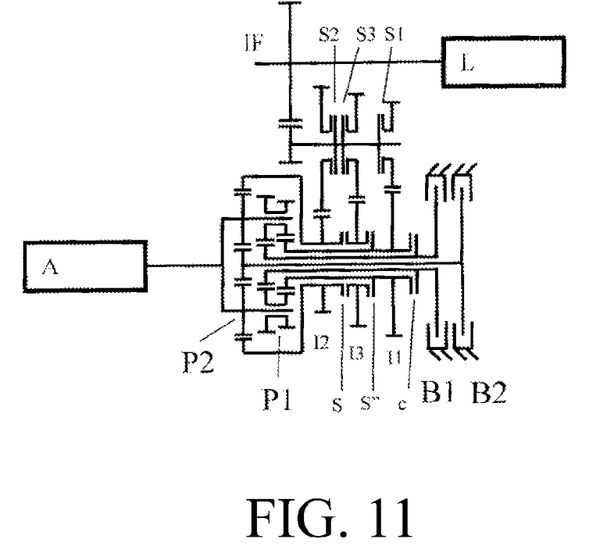
FIG. 11 shows a constructive embodiment of the transmission system shown in FIG. 10 having 8 or 9 gears.

FIG. 10 shows an eighth embodiment of the transmission according to the invention. This transmission system Ts8 comprises three sub-transmissions and a reverse transmission. FIG. 11 shows a constructive embodiment of the transmission system shown in FIG. 10 comprising 8 or 9 gears. In this transmission system Ts8 the transmission short circuit clutches s and s" are positioned coaxially relative to the clutch devices B1 and B2. The speed transforming mechanism P1 and P2 are arranged as bypass transmissions (planetary gear sets) having three rotational members, the first rotational member of which is formed by a planet carrier, the second rotational member of which is formed by a ring gear and the third rotational member of which is formed by a sun gear.

An embodiment of the transmission system shown in FIG. 10 is shown hereinafter in the form of a table:

| Gear | Ratio | Ratio step | B1 | B2 | s | s" | c | S1 | S2 | S3 | SR |
|---|---|---|---|---|---|---|---|---|---|---|---|
| R | −17 | | x | | | | | | X | | x |
| N | | | | | | | | | x | | (x) |
| 1 | 18 | | x | | x | x | | | x | | |
| 2 | 10.5 | 1.71 | | x | (x) | x | | | x | (x) | (x) |
| 3 | 7.2 | 1.45 | x | | (x) | x | | | (x) | x | |
| 4 | 5.4 | 1.33 | | | (x) | x | x | | | x | |
| 5 | 4.2 | 1.29 | | x | x | (x) | | | | x | |
| 6 | 3.3 | 1.29 | x | | (x) | (x) | | x | | | |
| 7 | 2.5 | 1.33 | | | (x) | (x) | x | x | | | |
| 8 | 1.9 | 1.29 | | x | x | x | | x | | | |
| 1* | 13.5 | | | | x | x | x | | x | | |
| — | RC | 9.4 | | | | | | | | | |

Ratio is velocity of input shaft/velocity of output shaft

Figure 12:
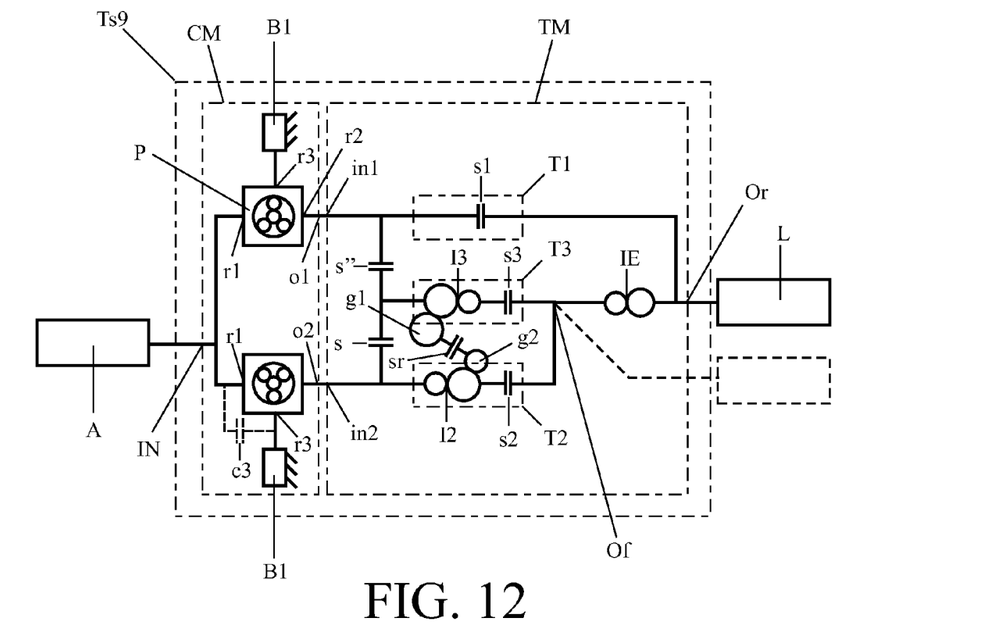
FIG. 12 shows a ninth embodiment of the transmission system according to the invention comprising three sub-transmissions and a reverse gear suitable for front-wheel and/or rear-wheel drive.

FIG. 12 shows a ninth embodiment of the transmission according to the invention comprising three sub-tramsmissions and a reverse transmission. In this transmission system Ts9 the speed transforming gear of the first sub-transmission T1 is formed by a shaft (1:1 gear ratio). This transmission system can be used for rear wheel drive (RWD), in which case the output is formed by Or and an extra speed transforming gear IE is located between the second and the third sub-transmission T2 and T3 and the output Or, as well as for front wheel drive (FWD), in which case the output is formed by Of and the extra speed transforming gear IE is located between the first sub-transmission T1 and the output Of (the extra speed transforming gear IE can in this case also form part of the first sub-transmission T1), as well as for four wheel drive.

Figure 13:
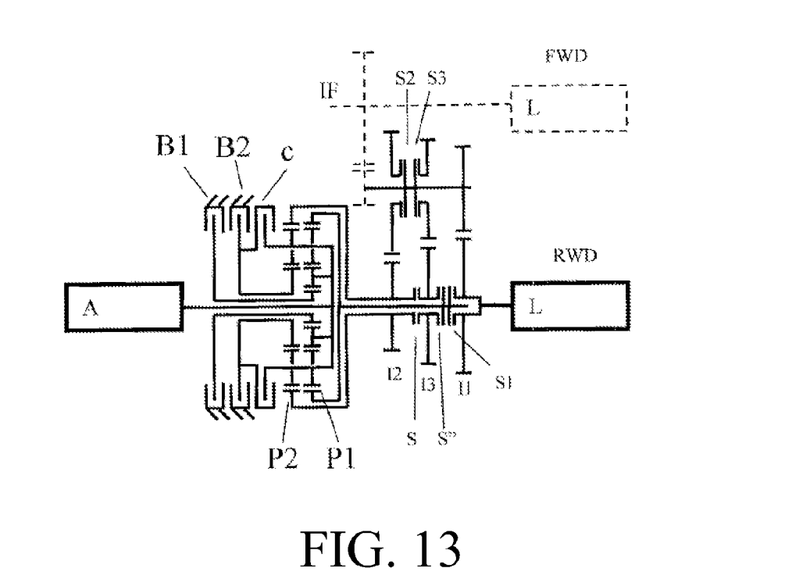
FIG. 13 shows a constructive embodiment of the transmission system shown in FIG. 12.

FIG. 13 shows a constructive embodiment of the transmission system shown in FIG. 12, where the ratio of the first bypass transmission P1 with brake B1 closed=(z+1)/z with z=−4, yields 0.75 (wa1/wc) and where the ratio of the second bypass transmission P2 with brake B2 closed=(z+1)/z with z=3, yields 1.33 (wa2/wc).

The transmission systems described hereinbefore can:
- be used for rear-wheel drive, where the output is connected to a rear differential via a differential gearbox;
- be used for four wheel drive, where either the front wheel configuration (transversely mounted engine) or the rear wheel configuration (longitudinally mounted engine) is taken as a basis;
- be arranged with any random planetary gear set with brake and clutch;
- be combined with all embodiments of the planetary gear set shown in the drawings with brake and clutch;
- be provided with any possible embodiments of a reverse gear; and
- be provided with any possible embodiments of a parking mechanism.

Albeit the invention has been described in the foregoing based on the drawings, it should be observed that the invention is not by any manner or means restricted to the embodiments shown in the drawings. The invention also extends to all embodiments deviating from the embodiments shown in the drawings within the spirit and scope defined by the claims.

For example, the transmission system may further be provided with an electromotor which is coupled or can be coupled to one or more of the elements of the transmission system. The elements of the transmission system are for example the speed transforming gears, clutches, rotational members etc. mentioned above. The electromotor may then be used for synchronisation of one or more of the transmission clutches and the clutch. In this case the electromotor is preferably connected to the second output of the clutch module and/or second input of the transmission module, where the electromotor supports the switching from one gear to the next in such a way that the electromotor reduces the energy dissipation of the energizing mechanism of the brakes or the clutch.

Likewise, the electromotor (motor/generator) may be used for driving the vehicle and/or assisting the combustion engine. In that case the electromotor is preferably coupled to an arbitrary shaft of the transmission system. The electromotor is in this case preferably coupled in such a way that it is also possible to drive purely electrically while the combustion engine can be disengaged clutch from the transmission system. Preferably, however, the electromotor is in this case located between the drive source and the clutch module.

Furthermore, in one of the above transmission systems a torque converter may be located between the combustion engine and the input of the clutch module. The clutch actuation may then be present concentrically around oil input/output of the torque converter.

Further, in all embodiments described above a further speed transforming gear may be located between the two outputs of the clutch module and/or the two inputs of the transmission module, which further speed transforming gear is connected in series with the transmission short circuit clutch(es).

What is claimed is:

1. A transmission system comprising:
a clutch module having a single input and a first and a second output, where between the first output and the input is located a first clutch device equipped with first energizing mechanism, and between the second output and the input is located a second clutch device equipped with second energizing mechanism, and
a transmission module having a single output and a first and a second input, where between the first input and the single output is located a first sub-transmission equipped with at least a single speed transforming gear and/or a single transmission clutch, and between the second input and the single output is located a second sub-transmission also equipped with at least a single speed transforming gear and/or a single transmission clutch;
wherein the two outputs of the clutch module are connected to the two inputs of the transmission module;
a first speed transforming mechanism located between the input and the first output of the clutch module;
a second speed transforming mechanism located between the input and the second output of the clutch module; and
a transmission short circuit clutch which is located between the two outputs of the clutch module and/or the two inputs of the transmission module.

2. The transmission system of claim 1, further comprising a further transmission short circuit clutch which is also located between the two outputs of the clutch module and/or the two inputs of the transmission module and is connected in series with the transmission short circuit clutch, where the two outputs of the clutch module and/or the two inputs of the transmission module can only be coupled to each other by closing the two transmission short circuit clutches.

3. The transmission system of claim 1, further comprising a third sub-transmission comprising at least one speed transforming gear the input of which sub-transmission is connected to the two transmission short circuit clutches at a location in between the two transmission short circuit clutches, and the output of which is connected to the output of the transmission module.

4. The transmission system of claim 2, wherein the input can be connected to the two transmission short circuit clutches by means of a still further short circuit clutch at a location in between the two transmission short circuit clutches.

5. The transmission system of claim 2, wherein the transmission short circuit clutches are switched by means of a single operating element with which three positions are possible: either or the two transmission short circuit clutches closed.

\* \* \* \* \*